(12) United States Patent
Lee et al.

(10) Patent No.: US 11,112,012 B2
(45) Date of Patent: Sep. 7, 2021

(54) DUSTPROOF GATE VALVE

(71) Applicant: KING LAI HYGIENIC MATERIALS CO., LTD, Zhubei (TW)

(72) Inventors: Chun-Chun Lee, Zhubei (TW); Chi-Che Huang, Zhubei (TW)

(73) Assignee: King Lai Hygienic Materials Co., Ltd, Zhubei (TW)

( * ) Notice: Subject to any disclaimer, the term of this patent is extended or adjusted under 35 U.S.C. 154(b) by 44 days.

(21) Appl. No.: 16/776,568

(22) Filed: Jan. 30, 2020

(65) Prior Publication Data

US 2021/0207719 A1 Jul. 8, 2021

(30) Foreign Application Priority Data

Jan. 2, 2020 (TW) .................................. 109100075

(51) Int. Cl.
*F16K 3/02* (2006.01)
*F16K 3/18* (2006.01)
*F16K 31/44* (2006.01)

(52) U.S. Cl.
CPC .......... *F16K 3/0227* (2013.01); *F16K 3/0218* (2013.01); *F16K 3/0254* (2013.01); *F16K 3/0281* (2013.01); *F16K 3/18* (2013.01); *F16K 31/44* (2013.01)

(58) Field of Classification Search
CPC .......... F16K 3/0227; F16K 31/44; F16K 3/18; F16K 3/0218; F16K 3/0281; F16K 3/0254
USPC .................................................. 251/326–329
See application file for complete search history.

(56) References Cited

U.S. PATENT DOCUMENTS

| | | | | |
|---|---|---|---|---|
| 4,605,198 A | * | 8/1986 | Greiner | F16K 1/24 251/229 |
| 4,718,637 A | * | 1/1988 | Contin | F16J 15/0881 251/158 |
| 6,464,203 B1 | * | 10/2002 | Ishigaki | F16K 3/10 251/215 |
| 6,474,622 B2 | * | 11/2002 | Ito | F16K 3/10 251/158 |
| 7,341,237 B2 | * | 3/2008 | Bosch | F16K 3/184 251/167 |
| 7,611,124 B2 | * | 11/2009 | Shindo | F16K 51/02 251/355 |

(Continued)

FOREIGN PATENT DOCUMENTS

TW I551798 B 10/2016

*Primary Examiner* — John Bastianelli
(74) *Attorney, Agent, or Firm* — Muncy, Geissler, Olds & Lowe, P.C.

(57) ABSTRACT

A dustproof gate valve includes a housing having a first panel, a second panel, and a valve port on each of the first and second panels, a slide including a body and a valve member and drivable to move between a first position and a second position, the slide closing the valve port of the first panel when at the first position, a driver mounted in the housing, a swing arm having one end thereof connected to the driver for moving the slide, and a dust pipe mounted in said body. When the slide is at the second position, the dust pipe is disposed between the valve port of the first panel and the valve port of the second panel, and the pipe wall of the dust pipe separates the valve ports of the first and second panels from the accommodation space.

6 Claims, 10 Drawing Sheets

(56) References Cited

U.S. PATENT DOCUMENTS 9,464,721 B2    10/2016   Yang et al.
9,482,350 B2 *   11/2016   Ishigaki ................. F16K 51/02

* cited by examiner

DUSTPROOF GATE VALVE

BACKGROUND OF THE INVENTION

1. Field of the Invention

The present invention relates to gate valve technology and more particularly, to a dustproof gate valve.

2. Description of the Related Art

Taiwan Patent 1551798, equivalent to U.S. Pat. No. 9,464,721, discloses a gate valve with a locking function. This design mainly uses a driver to drive a swing arm, thereby moving a slide. When the slide is moved to the second locking position, the valve member at the slide blocks the valve port, thereby achieving the effect of locking the valve member when the gate valve is closed.

The aforementioned known techniques are generally used in situations where a vacuum or a gas barrier is required. However, if this design of gate valve is used in a dirty environment, for example, in a dusty environment, it can achieve a sealing effect to block dust when it is closed. However, when it is opened, the valve member is moved away from the valve port, leaving the valve port in communication with the internal space of the gate valve, so dust will easily enter the interior of the gate valve from the valve port to contaminate most of the components. Therefore, when the gate valve is opened (that is, the valve member is moved away from the valve port to open the gate valve), it can be an urgently needed technology to provide a component with a dustproof effect that allows gas to pass through.

SUMMARY OF THE INVENTION

The present invention has been accomplished under the circumstances in view. It is the main object of the present invention to provide a dustproof gate valve, which completely closes the valve port when it is closed, and uses a dust pipe to shield the gap between the valve port and the housing of the gate valve when it is opened, thereby prohibiting dust from entering the inside of the gate valve.

To achieve this and other objects of the present invention, a dustproof gate valve comprises a housing, a slide, a driver, a swing arm, and a dust pipe. The housing is flat-shaped, comprising a first panel, a second panel, an accommodation space defined between the first panel and the second panel, and a guide rail set disposed inside the housing. The first panel and the second panel each have a valve port disposed opposite to each other. The guide rail set is substantially linear and has a curved portion at one end thereof. The slide comprises a body, and a valve member located on the body. The body is movably mounted in the housing, providing a driving chute. The valve member is movably mounted on the body, comprising a pulley set that is slidably mounted on the guide rail set inside the housing. The slide is drivable to move between a first position and a second position by the assembly relationship between the pulley set and the guide rail set. The pulley set enters the curved portion to move the valve member to the first panel in a linear extending direction perpendicular to the guide rail set and to close the valve port of the first panel when the slide is at the first position. The swing arm has one end thereof connected to the driver, and an opposite end thereof provided with a sliding block that is disposed in the driving chute. The driver is operable to drive the other end of the swing arm for circular motion. The sliding block is movable along the driving chute to act on the chute wall of the driving chute, thereby driving the slide to move. The dust pipe is mounted in the body and disposed between the valve port of the first panel and the valve port of the second panel to spatially connect the valve port of the first panel and the valve port of the second panel to the dust pipe when the slide is at the second position, and the pipe wall of the dust pipe is located at the edges of the valve ports of the first panel and the second panel to separate the valve port of the first panel and the valve port of the second panel from the accommodation space.

In this way, the present invention can completely close the valve port of the first panel when the dustproof gate valve is closed, and the gap between the two valve ports and the housing can be shielded by the dust pipe when the dustproof gate valve is opened. By blocking the dust and making it difficult to enter the inside of the dustproof gate valve.

Other advantages and features of the present invention will be fully understood by reference to the following specification in conjunction with the accompanying drawings, in which like reference signs denote like components of structure.

DETAILED DESCRIPTION OF THE INVENTION

Figure 1:
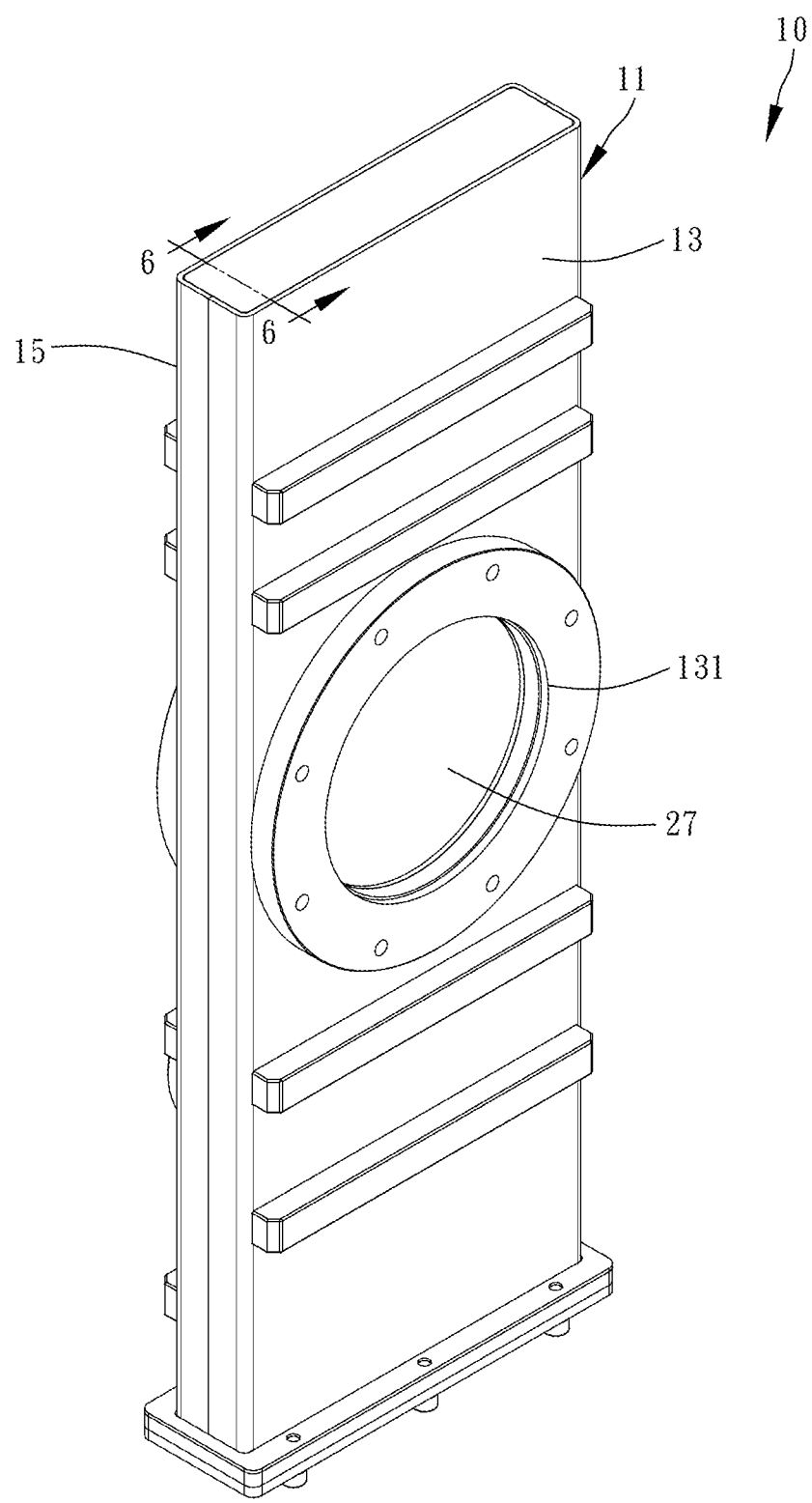
FIG. 1 is an elevational view of a dustproof gate valve in accordance with the present invention.
Figure 2:
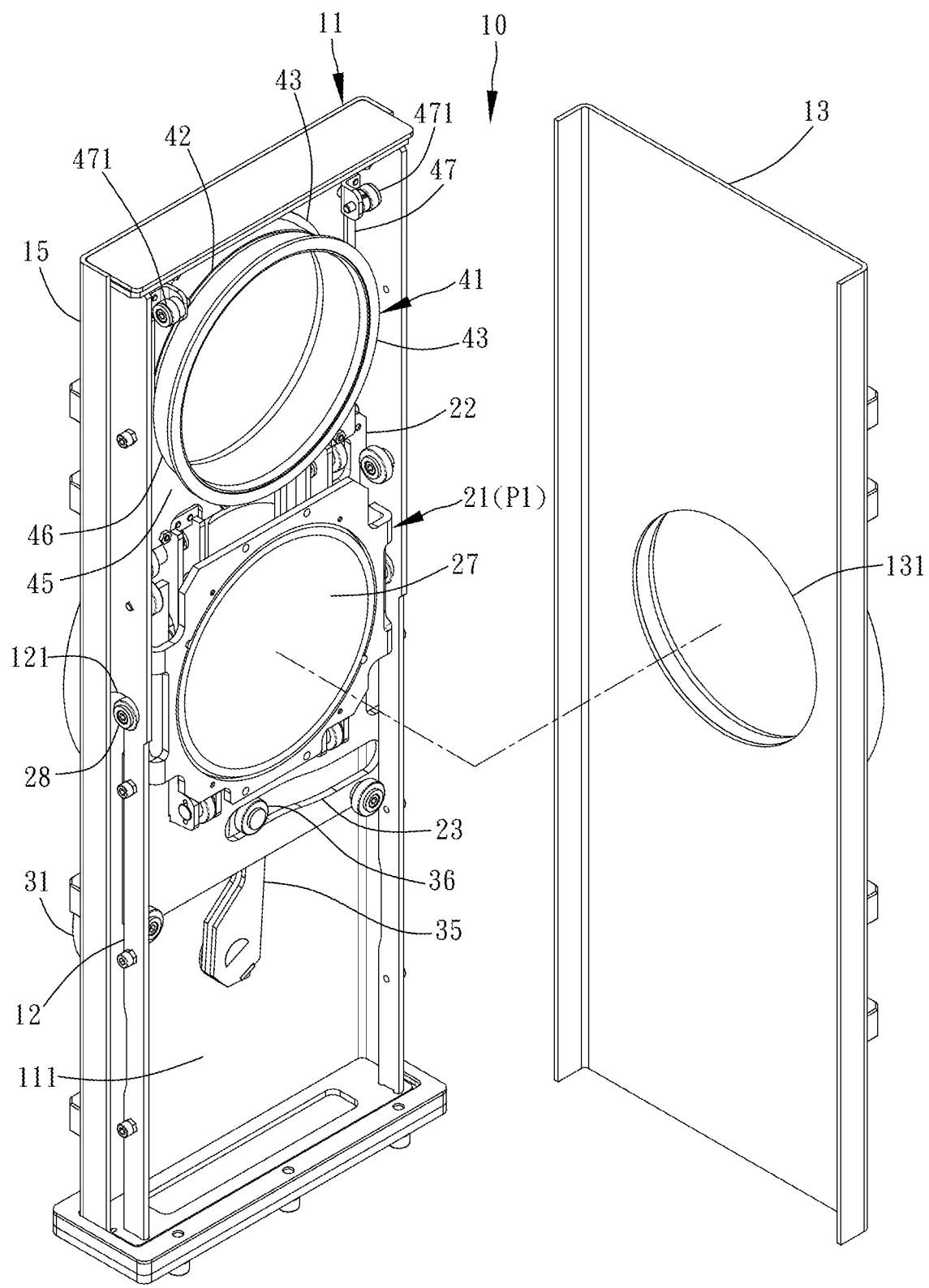
FIG. 2 is a partial exploded view of the dustproof gate valve in accordance with the present invention, showing the state where the first panel is removed.
Figure 3:
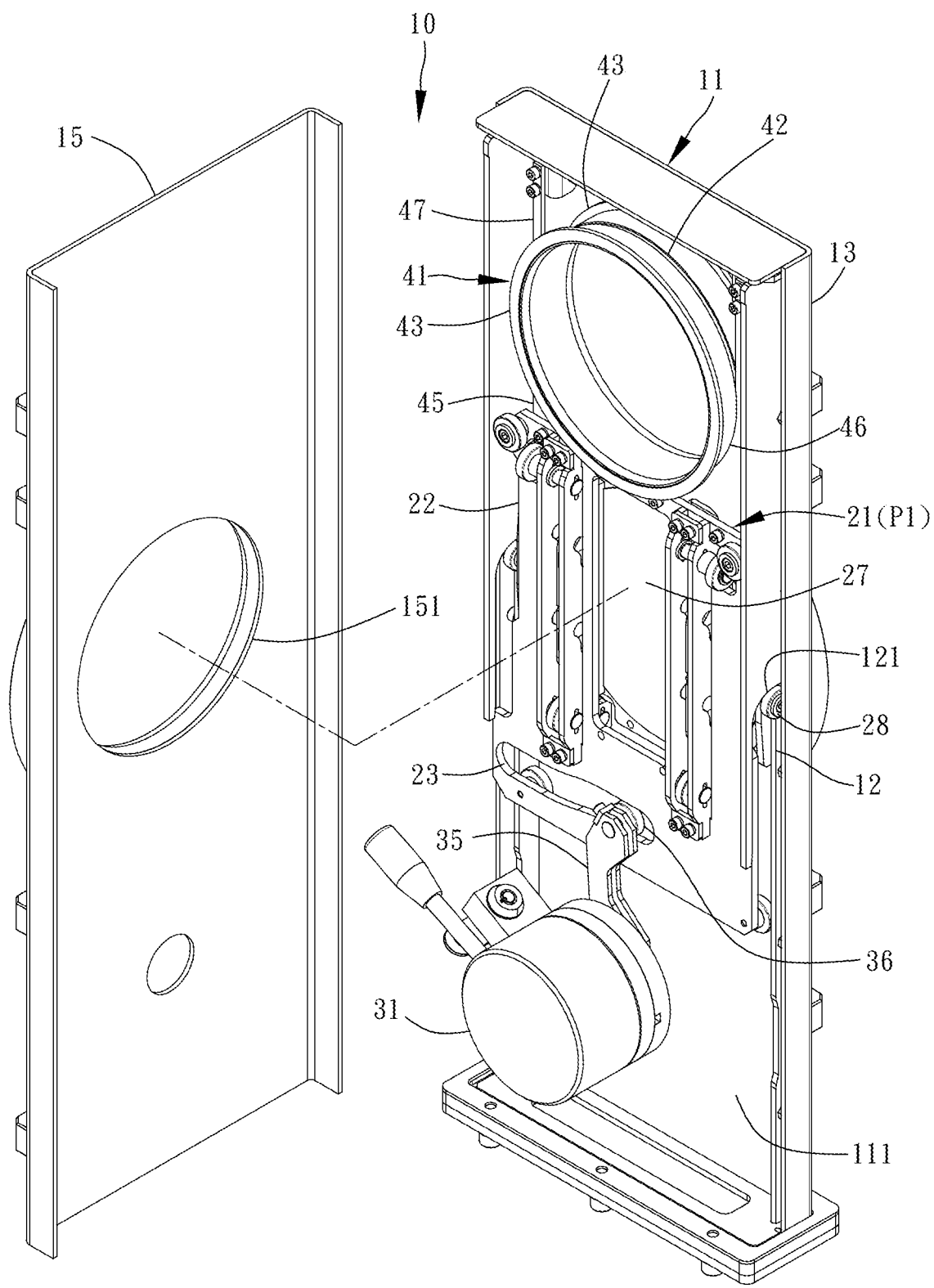
FIG. 3 is another partial exploded view of the dustproof gate valve in accordance with the present invention, showing the state where the second panel is removed.
Figure 4:
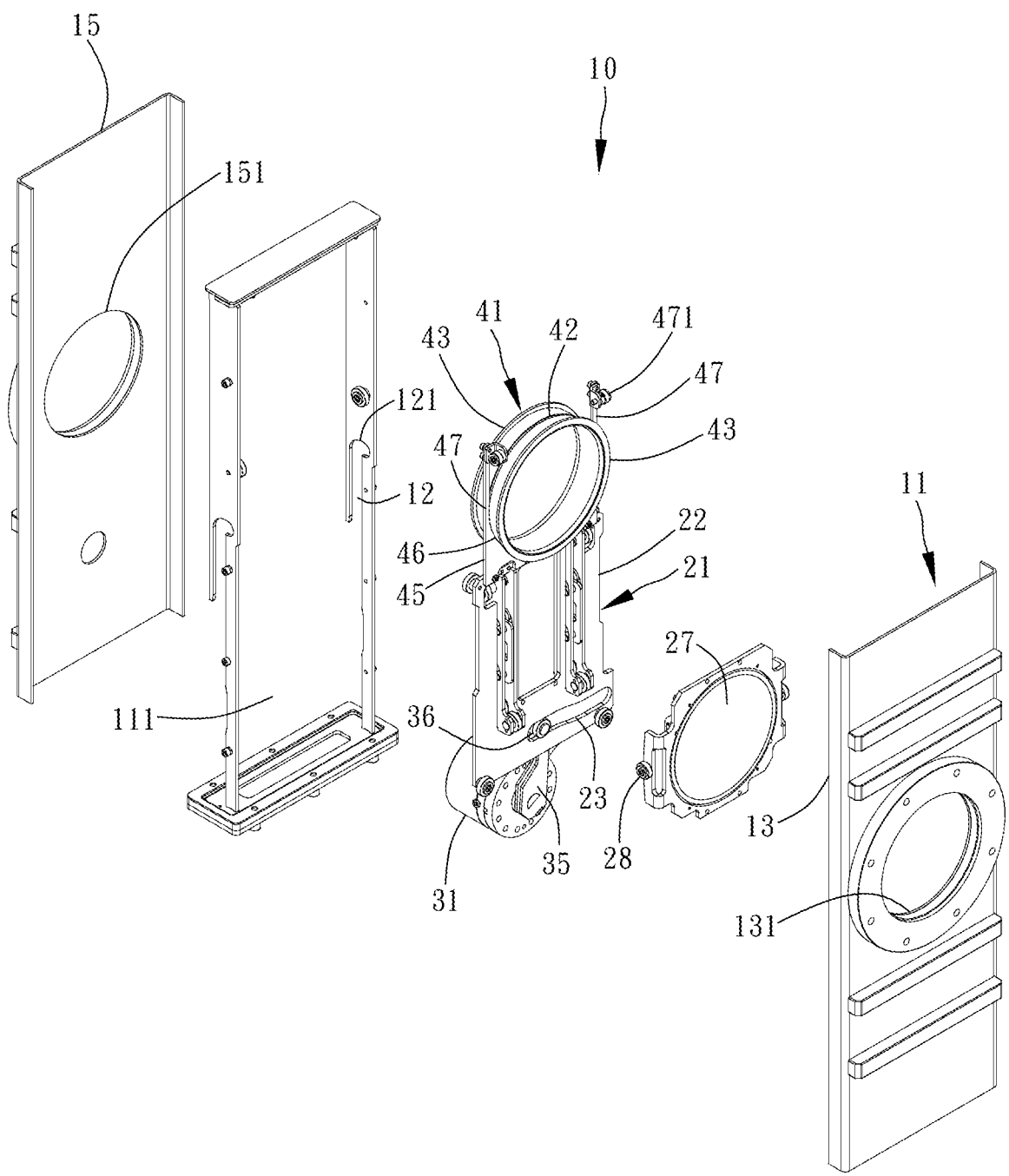
FIG. 4 is an exploded view of the dustproof gate valve in accordance with the present invention.
Figure 5:
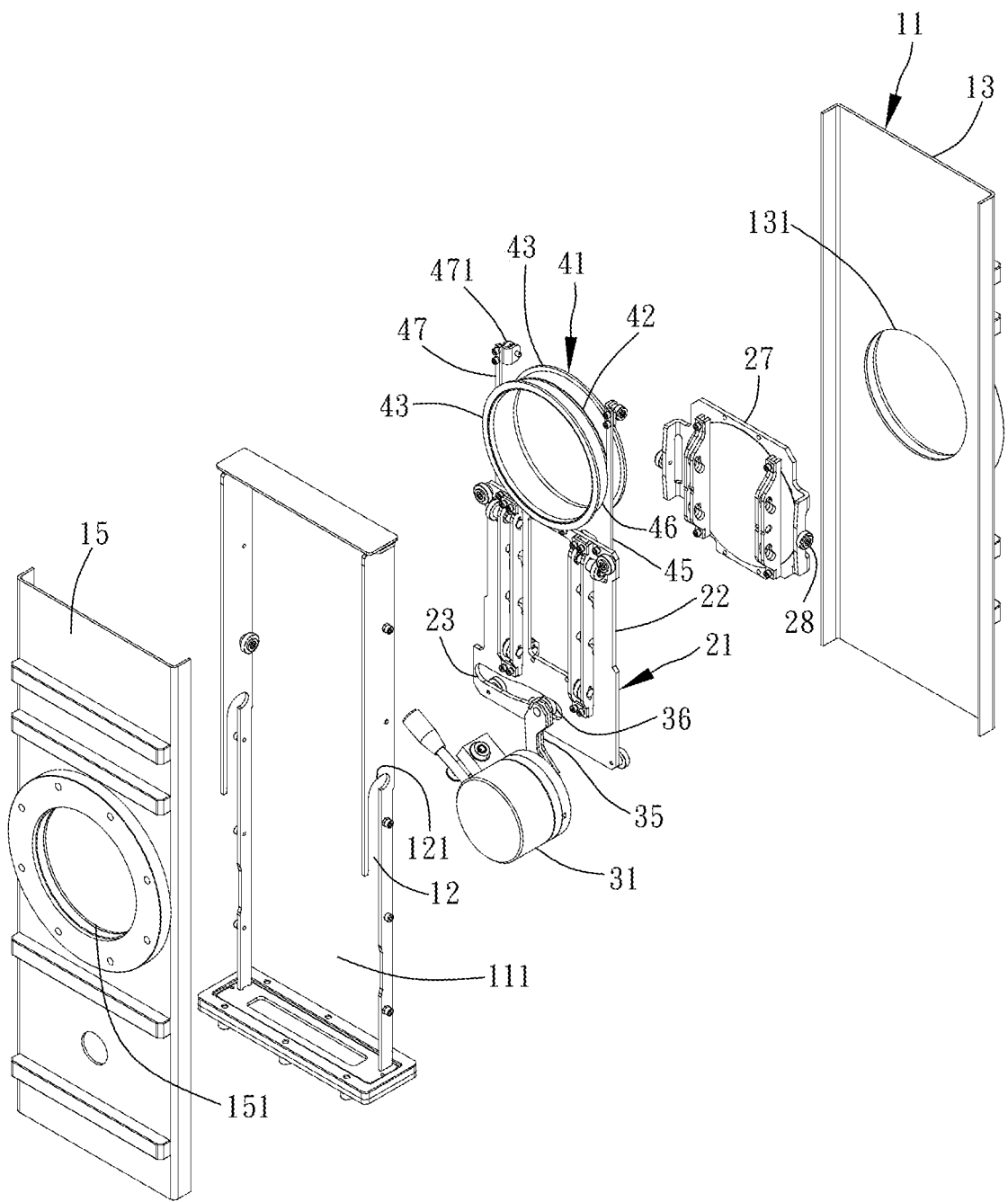
FIG. 5 correspond to FIG. 4 when viewed from another angle.
Figure 6:
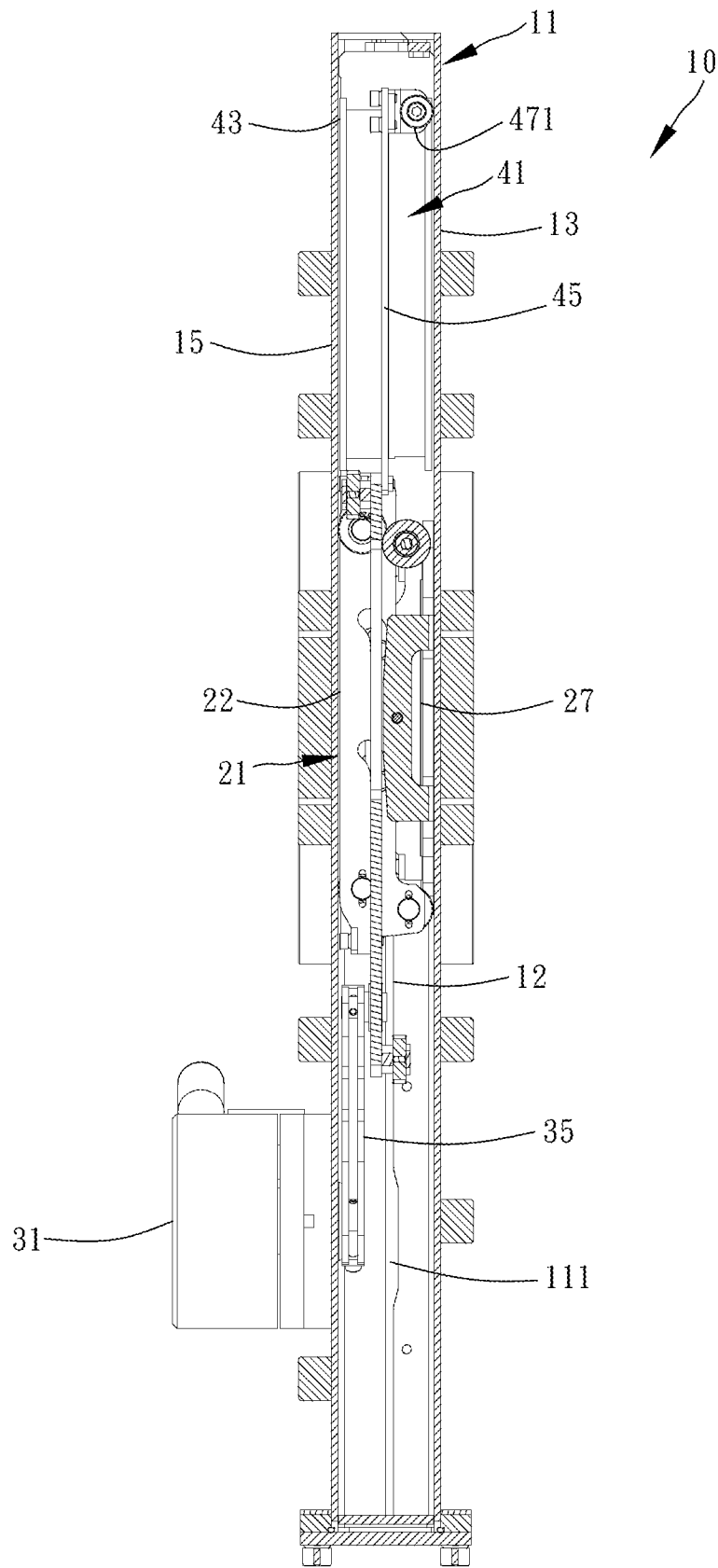
FIG. 6 is a sectional view taken along line 6-6 of FIG. 1.
Figure 7:
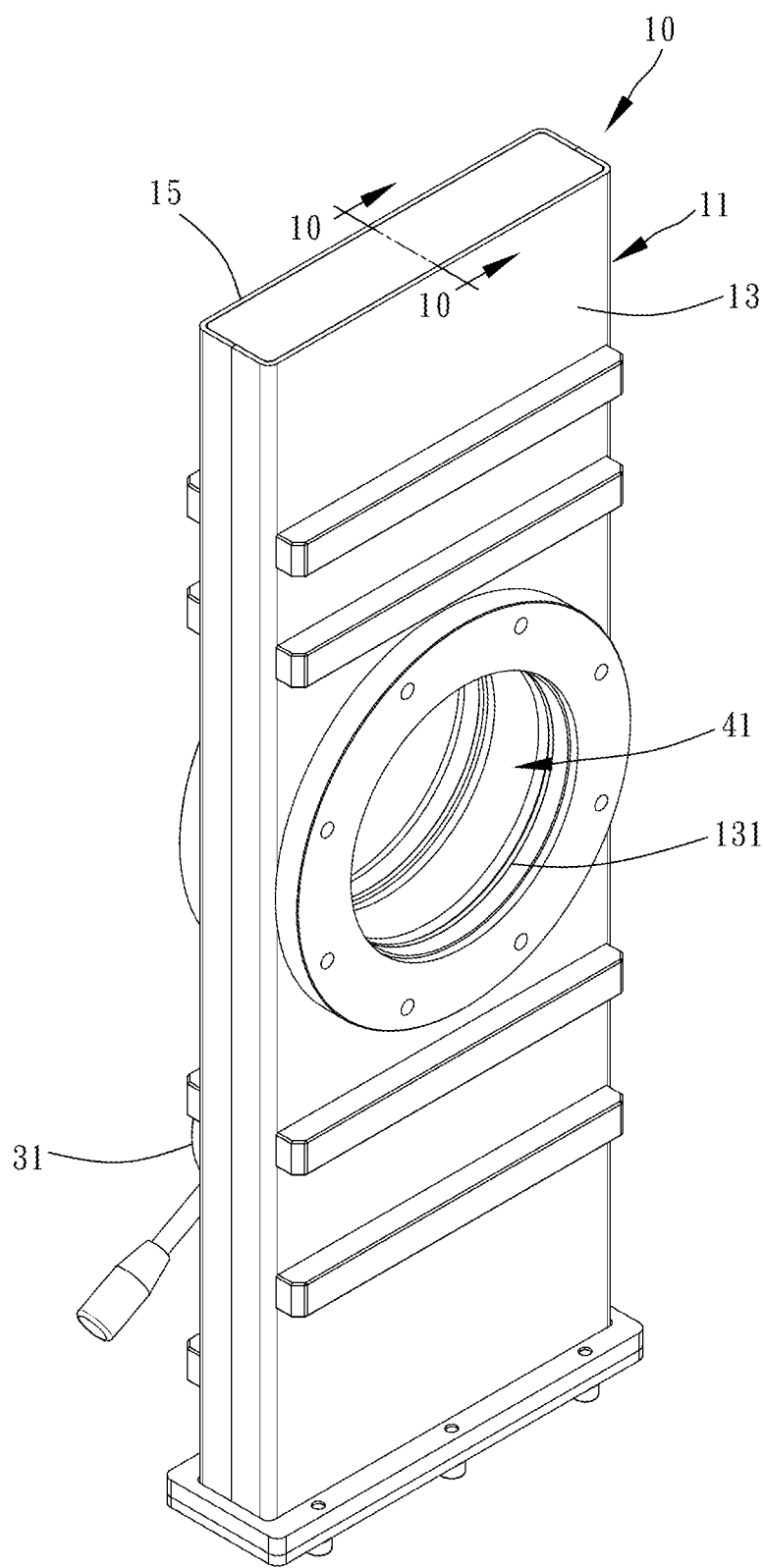
FIG. 7 is a schematic diagram of the operation of the dustproof gate valve in accordance with the present invention, showing the dust pipe moved to the valve port of the first panel and the valve port of the second panel.
Figure 8:
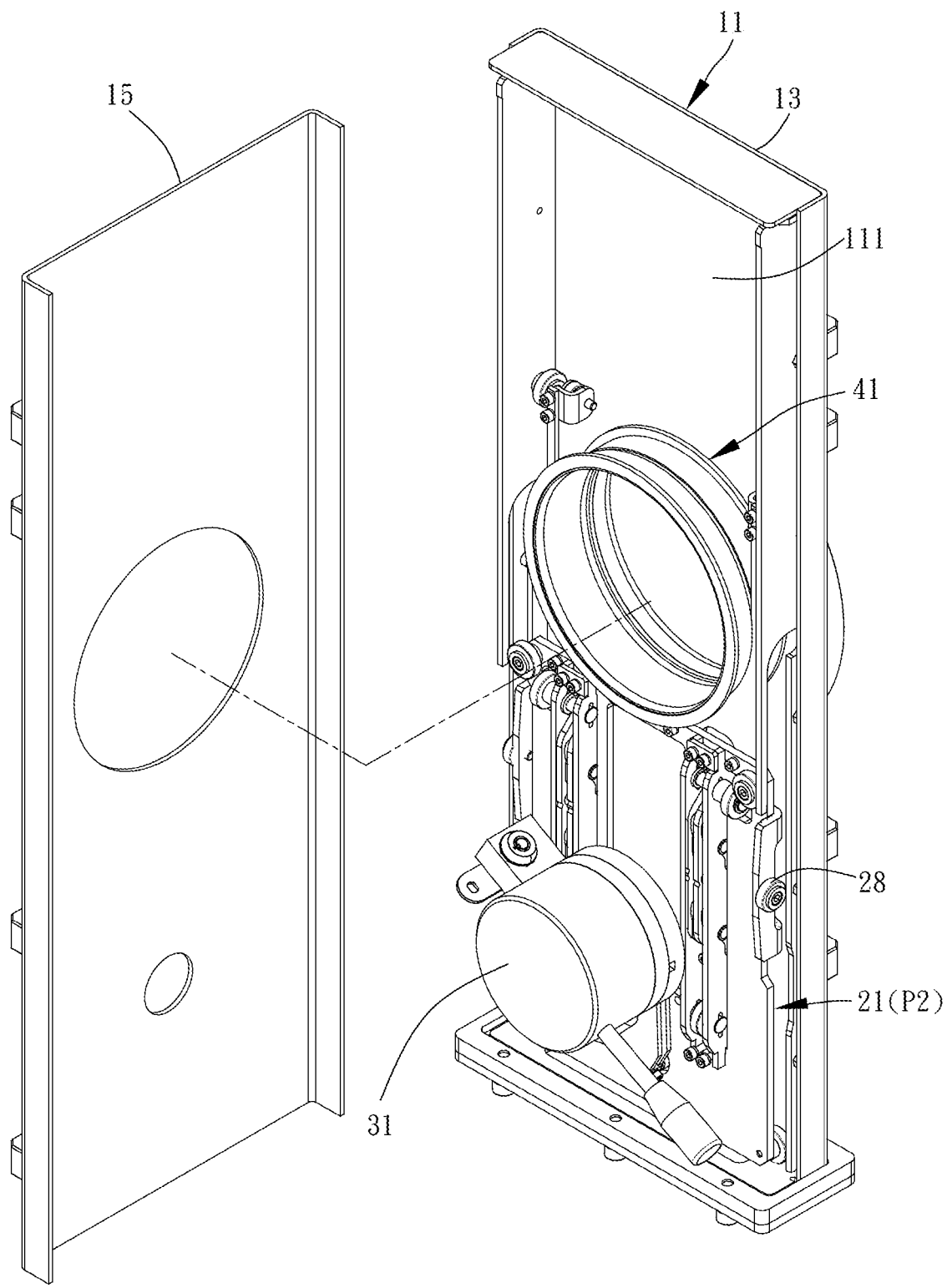
FIG. 8 is another schematic diagram of the operation of the dustproof gate valve in accordance with the present invention, showing the second panel removed.
Figure 9:
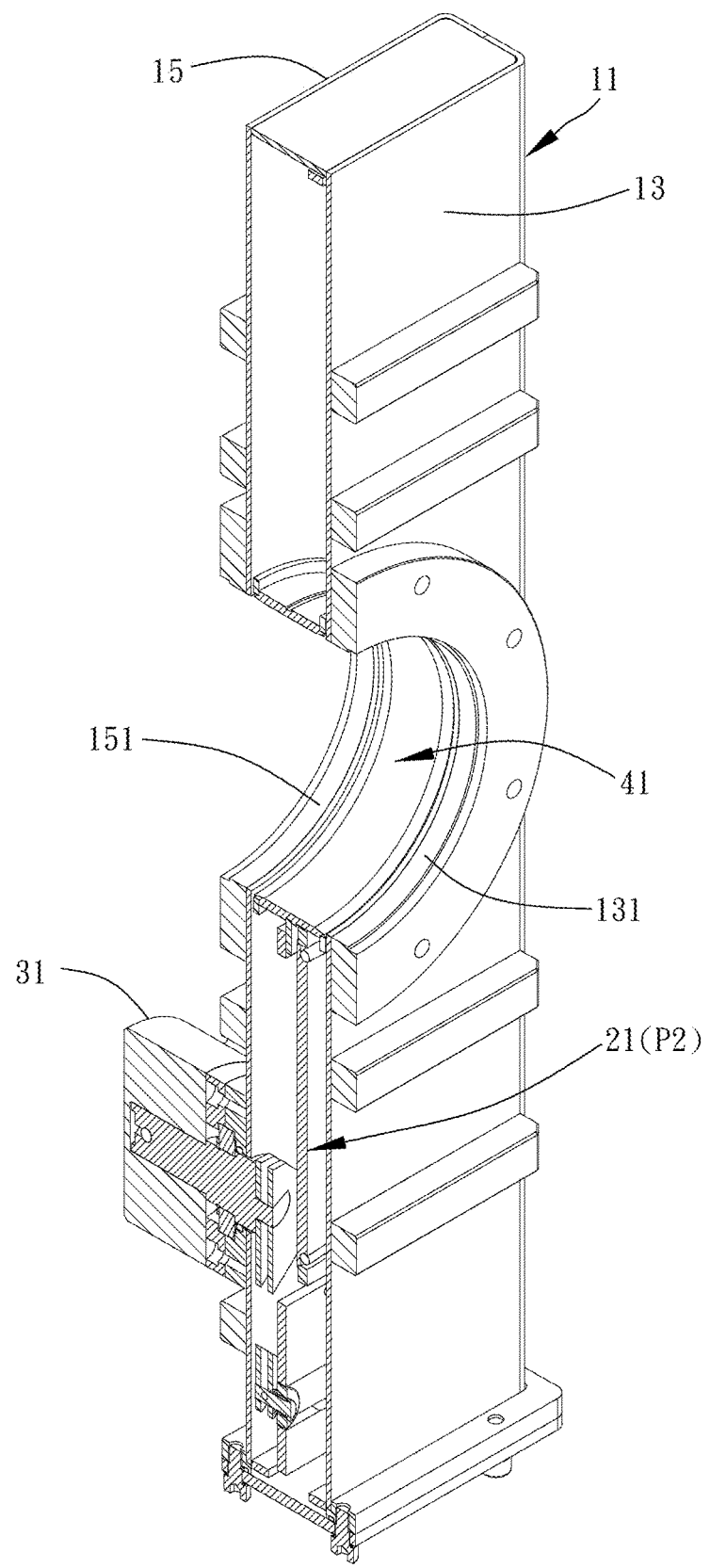
FIG. 9 is a sectional elevation of the dustproof gate valve in accordance with the present invention.
Figure 10:
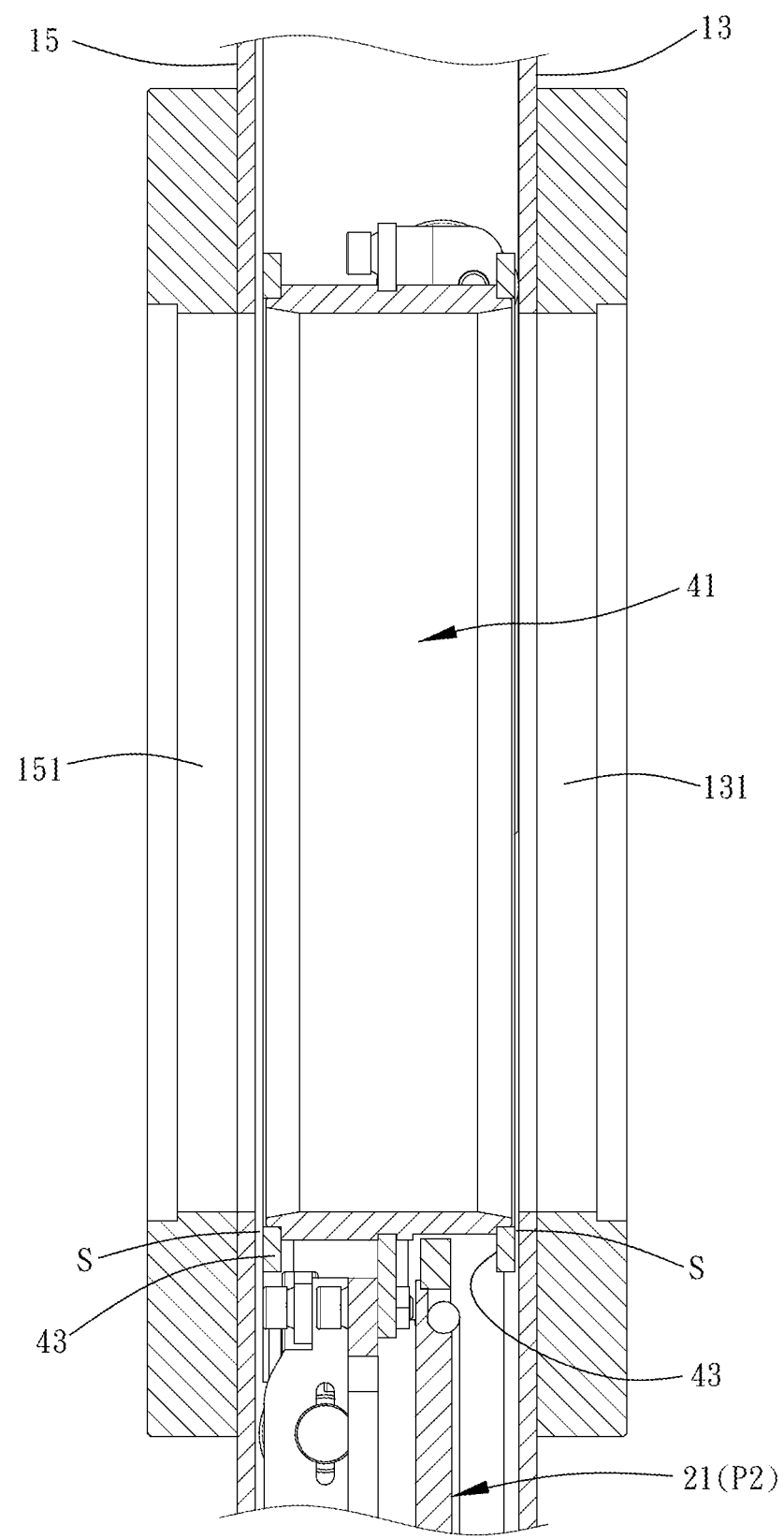
FIG. 10 is a sectional view taken along line 10-10 of FIG. 7.

Referring to FIGS. 1-10, a dustproof gate valve 10 in accordance with the present invention mainly comprises a housing 11, a slide 21, a driver 31, a swing arm 35 and a dust pipe 41.

The housing 11 is flat, comprising a first panel 13, a second panel 15, and an accommodation space 111 defined between the first panel 13 and the second panel 15. The first panel 13 and the second panel 15 each have a valve port 131,151 cut therethrough and disposed opposite to each other. The housing 11 is internally provided with a guide rail set 12, which is substantially linear but has a curved portion 121 at one end.

The slide 21 comprises a body 22 and a valve member 27. The body 22 is movably mounted in the housing 11 and has a driving chute 23. The valve member 27 is movably mounted in the body 22 and provided with a pulley set 28. The pulley set 28 is slidably mounted on the guide rail set 12 inside the housing 11. The slide 21 is driven to move between a first position P1 and a second position P2 by the assembly relationship of the pulley set 28 and the guide rail set 12. When the slide 21 is at the first position P1, the pull set 28 enters the curved portion 121 and drives the valve member 27 to move to the first panel 13 in a straight line extending perpendicular to the guide rail set 12 and closes the valve port 131 of the first panel 13.

The driver 31 is mounted to the housing 11. In this embodiment, the driver 31 is a handle, and can be manually operated to rotate. However, in actual implementation, a pneumatic device such as a pneumatic cylinder or an electric device such as a motor can be used as the driver.

The swing arm 35 has one end thereof connected to the driver 31, and an opposite end thereof provided with a sliding block 36 that is disposed in the driving chute 23. The driver 31 is operated to drive the other end of the swing arm 35 for circular motion, and the sliding block 36 moves along the driving chute 23 to act on the chute wall of the driving chute 23, thereby driving the slide 21 to move.

The dust pipe 41 is mounted on the body 22. When the slide 21 is at the second position P2, the dust pipe 41 corresponds to the valve port 131 of the first panel 13 and the valve port 151 of the second panel 15 so that the valve port 131 of the first panel 13 and the valve port 151 of the second panel 15 are spatially connected to the dust pipe 41, and the pipe wall of the dust pipe 41 is located at the edges of the valve ports 131, 151 of the first panel 13 and the second panel 15 to separate the valve port 131 of the first panel 13 and the valve port 151 of the second panel 15 from the accommodation space 111. In addition, both ends of the dust pipe 41 are separated from the first panel 13 and the second panel 15 by a predetermined distance, leaving a gap S. In this embodiment, the dust pipe 41 is provided on the body 22 through a dust frame 45. The dust pipe 41 has a mounting groove 42 located on an outer wall thereof. The dust frame 45 has a flange 46. The dust pipe 41 is coupled to the flange 46 with its mounting groove 42. In addition, the dust frame 45 has two extension arms 47 extending in direction away from the body 22. The two extension arms 47 are located on two opposite sides of the dust pipe 41, each having a distal end provided with a roller 471. When the slide 21 is at the first position P1, the rollers 471 of the two extension arms 47 are stopped at the panel surface of the first panel 13. In actual implementation, the dust pipe 41 has a ring shape, as shown in FIGS. 2-5, and both ends of the dust pipe 41 face the first panel 13 and the second panel 15, and the end edges of the two ends of the dust pipe 41 extend radially outward to form a respective shoulder 43. This shoulder 43 can increase the depth of the gap S between the two valve ports 131,151 and the dust pipe 41, making it more difficult for dust to enter the housing 11 from the gap S. The arrangement of this shoulder 43 can be decided according to the needs. Whether the dust pipe 41 is set without the shoulder 43 can also achieve the effect of dust prevention. The dust pipe 41 can achieve the same dust-proof effect without the shoulder 43. Therefore, the shoulder 43 may not be provided.

The structure of the present invention has been described above, and the operation of the present invention is explained hereinafter.

As shown in FIGS. 2-6, when closing the valve port 131 of the first panel 13, the driver 31 is operated to rotate the swing arm 35 to move the slide 21 to the first position P1. At this time, because the pulley set 28 of the valve member 27 enters the curved portion 121 to move the valve member 27 in a straight line extending perpendicular to the guide rail set 12, thereby causing the valve member 27 to move to the first panel 13 in the direction perpendicular to the guide rail set 12 and to close the valve port 131 of the first panel 13. In this closed state, no air or dust can pass through the valve port 131 of the first panel 13. As for whether the body 22 moves in the direction perpendicular to the guide rail set 12 with the valve member 27, it is a conventional technology, and will not be described in detail. If the present invention is used with the valve member 27 facing downward, the dust pipe 41 may be forced by gravity to cause the two extension arms 47 to sag. In case the two extension arms 47 are forced to sag, the rollers 471 at the ends of the extension arms 47 can be stopped against the first panel 13, thereby ensuring that the dust frame 45 does not touch the first panel 13.

As shown in FIGS. 7-10, when opening the valve port 131 of the first panel 13, the driver 31 is operated to rotate the swing arm 35 to move the slide 21 to the second position P2. At this time, the valve member 27 is moved away from the valve port 131 of the first panel 13 and the valve port 151 of the second panel 15, and the dust pipe 41 is moved to the position between the valve port 131 of the first panel 13 and the valve port 151 of the second panel 15, enabling the valve port 131 of the first panel 13 and the valve port 151 of the second panel 15 to be spatially connected with the dust pipe 41. In this way, it is possible to form the same state as the conventional gate valve without the said dust pipe 41 is opened. Since the pipe wall of the dust pipe 41 is located on the edges of the valve ports 131, 151 of the first panel 13 and the second panel 15 to separate the valve ports 131, 151 of the first panel 13 and the second panel 15 from the accommodation space 111, the dust passing through the valve port 131 of the first panel 13, the dust pipe 41 and the valve port 151 of the second panel 15 is not easy to fall from the space between the first panel 13 and the second panel 15 into the housing 11, thereby achieving the effect of dust prevention.

In addition, since the end edges of the two ends of the dust pipe 41 are separated from the first panel 13 and the second panel 15 by a predetermined distance to leave the gap S, it can be ensured that when the dust pipe 41 is moving to the position between the valve ports 131, 151 of the first panel 13 and the second panel 15, there will be no component collision or noise. Although the gap S may allow dust to enter the housing 11, the amount of dust is very small compared to the conventional technology. In actual manufacturing, the gap S can be reduced by improving the assembly precision, thereby further reducing the amount of falling dust.

As can be seen from the above, the present invention can completely close the valve port 131 of the first panel 13 when the dustproof gate valve is closed, and the gap S between the two valve ports 131, 151 and the housing 11 can be shielded by the dust pipe 41 when the dustproof gate valve is opened. By blocking the dust and making it difficult to enter the dustproof gate valve, the present invention achieves the effect of dust prevention.

What is claimed is:
1. A dustproof gate valve, comprising:
a housing in a flat shape, said housing comprising a first panel, a second panel, an accommodation space defined between said first panel and said second panel and a guide rail set disposed inside said housing, said first panel and said second panel each having a valve port disposed opposite to each other, said guide rail set being substantially linear and having a curved portion at one end thereof;

a slide comprising a body and a valve member located on said body, said body being movably mounted in said housing and providing a driving chute, said valve member being movably mounted on said body, said valve member comprising a pulley set, said pulley set being slidably mounted on said guide rail set inside said housing, said slide being drivable to move between a first position and a second position by the assembly relationship between said pulley set and said guide rail set, said pulley set entering said curved portion to move said valve member to said first panel in a linear extending direction perpendicular to said guide rail set and to close said valve port of said first panel when said slide is at said first position;

a driver mounted in said housing; and a swing arm having one end thereof connected to said driver and an opposite end thereof provided with a sliding block that is disposed in said driving chute, said driver being operable to drive the other end of said swing arm for circular motion, and said sliding block being movable along said driving chute to act on the chute wall of said driving chute, thereby driving said slide to move;

wherein said dustproof gate valve further comprises:

a dust pipe mounted in said body, said dust pipe being disposed between said valve port of said first panel and said valve port of said second panel to spatially connect said valve port of said first panel and said valve port of said second panel to said dust pipe when said slide is at said second position, and the pipe wall of said dust pipe is located at the edges of said valve ports of said first panel and said second panel to separate said valve port of said first panel and said valve port of said second panel from said accommodation space.

2. The dustproof gate valve as claimed in claim 1, wherein said dust pipe is mounted on said body by a dust frame.

3. The dustproof gate valve as claimed in claim 2, wherein said dust frame comprises two extension is extending in direction away from said body and respectively disposed at two opposite sides relative to said dust pipe, each said extension arm having a roller located at a distal end thereof, said rollers of said two extension arms being stopped against a panel surface of said first panel when said slide is at said first position.

4. The dustproof gate valve as claimed in claim 2, wherein said dust pipe comprises a mounting groove; said dust frame comprises a flange coupled to said mounting groove of said dust pipe.

5. The dustproof gate valve as claimed in claim 1, wherein the two opposite ends of said dust pipe are separated from said first panel and said second panel by a predetermined distance to leave a gap when said slide is at said second position.

6. The dustproof gate valve as claimed in claim 1, wherein the end edges of the two opposite ends of said dust pipe extend radially outward to form a respective shoulder.

* * * * *